(12) United States Patent
Momoe et al.

(10) Patent No.: US 11,479,956 B2
(45) Date of Patent: Oct. 25, 2022

(54) FLUSH TOILET

(71) Applicant: TOTO LTD., Kitakyushu (JP)

(72) Inventors: Masaaki Momoe, Kitakyushu (JP); Shu Kashirajima, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 0 days.

(21) Appl. No.: 17/158,661

(22) Filed: Jan. 26, 2021

(65) Prior Publication Data

US 2021/0238836 A1 Aug. 5, 2021

(30) Foreign Application Priority Data

Feb. 4, 2020 (JP) .............................. JP2020-016746

(51) Int. Cl.
E03D 5/01 (2006.01)
E03D 5/10 (2006.01)

(52) U.S. Cl.
CPC ................. *E03D 5/01* (2013.01); *E03D 5/10* (2013.01)

(58) Field of Classification Search
CPC ....................................................... E03D 5/01
USPC ............................................................ 4/432
See application file for complete search history.

(56) References Cited

U.S. PATENT DOCUMENTS

2009/0313750 A1* 12/2009 Okubo ...................... E03D 5/01
4/354

FOREIGN PATENT DOCUMENTS

JP 2009-30405 A 2/2009
JP 2014-114627 A 6/2014

* cited by examiner

*Primary Examiner* — Lauren A Crane

(74) *Attorney, Agent, or Firm* — BakerHostetler

(57) ABSTRACT

There is provided a flush toilet that performs flushing by rim spouting, the flush toilet allowing the size of a flush water tank to be reduced while enabling discharge of a sufficient amount of flush water to a toilet main body. A flush toilet 1 includes a toilet main body 2 including a bowl 2a, a rim 2c and a rim spout port 2f for discharging supplied flush water to the rim 2c, a flush water tank device 4, a pump device 6, a water supply device 8, and a controller 10, where the controller 10 is capable of performing a flushing mode in which the total amount of discharge of flush water discharged to the rim spout port 2f by the pump device 6 is greater than a tank capacity of the flush water tank device 4, and the controller 10 controls driving of the pump device 6 and the water supply device 8 in the flushing mode such that at least a part of a water supply period when flush water is supplied by the water supply device overlaps a discharge period when flush water is discharged by the pump device 6.

6 Claims, 4 Drawing Sheets

FLUSH TOILET

CROSS-REFERENCE TO RELATED APPLICATION

This application claims benefit of priority to Japanese Patent Application No. 2020-016746, filed Feb. 5, 2020, the entire content of which is incorporated herein by reference.

BACKGROUND OF THE INVENTION

Field of the Invention

The present invention relates to a flush toilet.

Description of the Related Art

Conventionally, there are known flush toilet devices that flush a toilet main body by discharging flush water that is stored in a flush water tank into the toilet main body by a pump device.

As such a flush toilet device, for example, Japanese Patent Laid-Open No. 2009-30405 discloses a flush toilet having a configuration where tap water (flush water) supplied from a water pipe is discharged by water supply pressure from a rim spout port formed in a rim of a toilet main body, and flush water stored in a flush water tank is pressurized by a pump device and is discharged from a jet spout port formed in a bottom portion of a bowl.

Furthermore, for example, Japanese Patent Laid-Open No. 2014-114627 discloses a flush toilet having a configuration where flush water in a tank is pressurized by a powered pump and is discharged from a rim spout port.

These days, there is a demand to reduce the size of a flush toilet to improve the design. To reduce the size of a flush toilet, it is conceivable to reduce the size of a flush water tank for storing flush water. However, when the flush water tank is reduced in size, the amount of water than can be stored in the flush water tank is reduced, and the amount of flush water that is discharged into a toilet main body is reduced. When the amount of flush water that is discharged into the toilet main body is reduced, black water is possibly not sufficiently drained away. Accordingly, some local municipalities set the amount of flush water that is to be discharged into the toilet main body, but if the size of the flush water tank is reduced, the set amount of flush water cannot be discharged.

The present invention has been made in view of the circumstances described above, and an object thereof is to provide a flush toilet that performs toilet flushing by rim spouting, where the size of a flush water tank can be reduced while allowing a sufficient amount of flush water to be discharged into a toilet main body.

SUMMARY OF THE INVENTION

The present invention is a flush toilet for discharging waste with flush water, the flush toilet including: a toilet main body including a bowl for receiving waste, a rim formed at a top edge of the bowl, and a rim spout port for discharging supplied flush water to the rim; a flush water tank for storing flush water for flushing the toilet main body; a pump device for supplying flush water in the flush water tank to the toilet main body; a water supply device for supplying flush water to the flush water tank; and a controller for controlling driving of the pump device, the controller being capable of controlling supply of flush water by the water supply device, where the controller is capable of performing a flushing mode in which a total amount of discharge of flush water that is discharged to the rim spout port by the pump device is greater than a tank capacity of the flush water tank, and the controller controls driving of the pump device and the water supply device in the flushing mode such that at least a part of a water supply period when flush water is supplied by the water supply device overlaps a discharge period when flush water is discharged by the pump device.

According to the present invention having the configuration described above, the controller controls driving of the pump device and the water supply device in the flushing mode such that a part of the water supply period when flush water is supplied by the water supply device overlaps the discharge period when flush water is discharged by the pump device. This enables a sufficient amount of flush water that is greater than the tank capacity of the flush water tank to be discharged from the rim spout port of the toilet main body even when the size of the flush water tank is reduced.

In the present invention, preferably, the toilet main body is configured such that flush water is discharged only from the rim spout port.

For example, in the case of discharging water from both a rim spout port and a jet spout port as in Japanese Patent Laid-Open No. 2009-30405, flush water supplied from a tank device is discharged from the jet spout port and flush water supplied from a water pipe is discharged from the rim spout port, and thus, a sufficient amount of flush water may be discharged into the toilet main body even if the capacity of the tank device is small. However, with the configuration of the present invention where flush water is discharged only from the rim spout port, flush water that is supplied from the water pipe and flush water that is supplied from the tank device cannot be discharged at the same time. However, according to the present invention having the configuration described above, driving of the pump device and the water supply device is controlled such that at least a part of the water supply period when flush water is supplied by the water supply device overlaps at least a part of the discharge period when flush water is discharged by the pump device. Accordingly, flush water that is supplied by the water supply device may also be discharged in one flushing operation in addition to the amount of water stored in the tank device, and a sufficient amount of flush water may be discharged into the toilet main body even in the case of discharging flush water only from the rim spout port.

In the present invention, preferably, in the flushing mode, the controller starts supply of flush water by the water supply device and discharge of flush water by the pump device simultaneously.

According to the present invention having the configuration described above, because supply of flush water by the water supply device and discharge of flush water by the pump device are started at the same time, discharge of flush water may be completed in a shortest time, and a time until the tank device becomes full after water is discharged into the toilet main body may be reduced.

In the present invention, preferably, the flush water tank includes an opening that is open to outside, and in the flushing mode, an instantaneous discharge flow rate (L/min) of flush water to the toilet main body by the pump device is greater than an instantaneous supply flow rate (L/min) of flush water to the flush water tank by the water supply device.

The flush water tank includes the opening that is open to outside as a partition to an upstream side (the water supply device side). Accordingly, when supply of flush water by the water supply device and discharge of flush water by the pump device are started at the same time, water possibly leaks to outside from the opening. However, according to the present invention having the configuration described above, because the instantaneous discharge flow rate (L/min) of flush water discharged into the toilet main body by the pump device is greater than the instantaneous supply flow rate (L/min) of flush water supplied to the flush water tank by the water supply device, leakage of water from the opening to outside may be prevented even when supply of flush water by the water supply device and discharge of flush water by the pump device are started at the same time.

In the present invention, preferably, an overflow channel is connected to the flush water tank, and the overflow channel communicates with the rim spout port.

According to the present invention having the configuration described above, in the case where the opening is formed in the flush water tank, because the overflow channel is formed, leakage of water from the opening may be more reliably prevented. Furthermore, even in the case where supply of flush water by the water supply device is started before discharge of flush water by the pump device, leakage from the opening may be reliably prevented.

In the present invention, preferably, the flush toilet further includes a float switch that is provided in the flush water tank, and that is capable of transmitting a detection signal to the controller when detecting that flush water in the flush water tank is at or above a predetermined water level, where the controller stops driving of the water supply device when the detection signal is received from the float switch.

Even when the float switch is provided, if the instantaneous discharge flow rate and the instantaneous supply flow rate are substantially the same, the water level in the flush water tank does not drop greatly and the float switch keeps transmitting the detection signal, and thus, driving of the water supply device is possibly not stopped based on the detection signal from the float switch. However, according to the present invention having the configuration described above, because supply of flush water by the water supply device and discharge of flush water by the pump device are started at the same time in the flushing mode, and the instantaneous discharge flow rate is greater than the instantaneous supply flow rate, the water level of flush water in the flush water tank inevitably drops. This causes the float switch to temporarily stop transmitting the detection signal, and driving of the water supply device may be stopped based on the detection signal from the float switch.

In the present invention, preferably, the controller stops water supply by the water supply device when a predetermined period of time elapses from start of water supply by the water supply device.

According to the present invention having the configuration described above, even in a case of failure of the float switch, for example, supply of water may be reliably stopped, and leakage of water may be prevented.

According to the present invention, there is provided a flush toilet that allows the size of a flush water tank to be reduced while enabling discharge of a sufficient amount of flush water to a toilet main body.

DETAILED DESCRIPTION OF THE PREFERRED EMBODIMENTS

Hereinafter, a toilet device according to embodiments of the present invention will be described in detail with reference to the drawings.

First Embodiment

Figure 1:
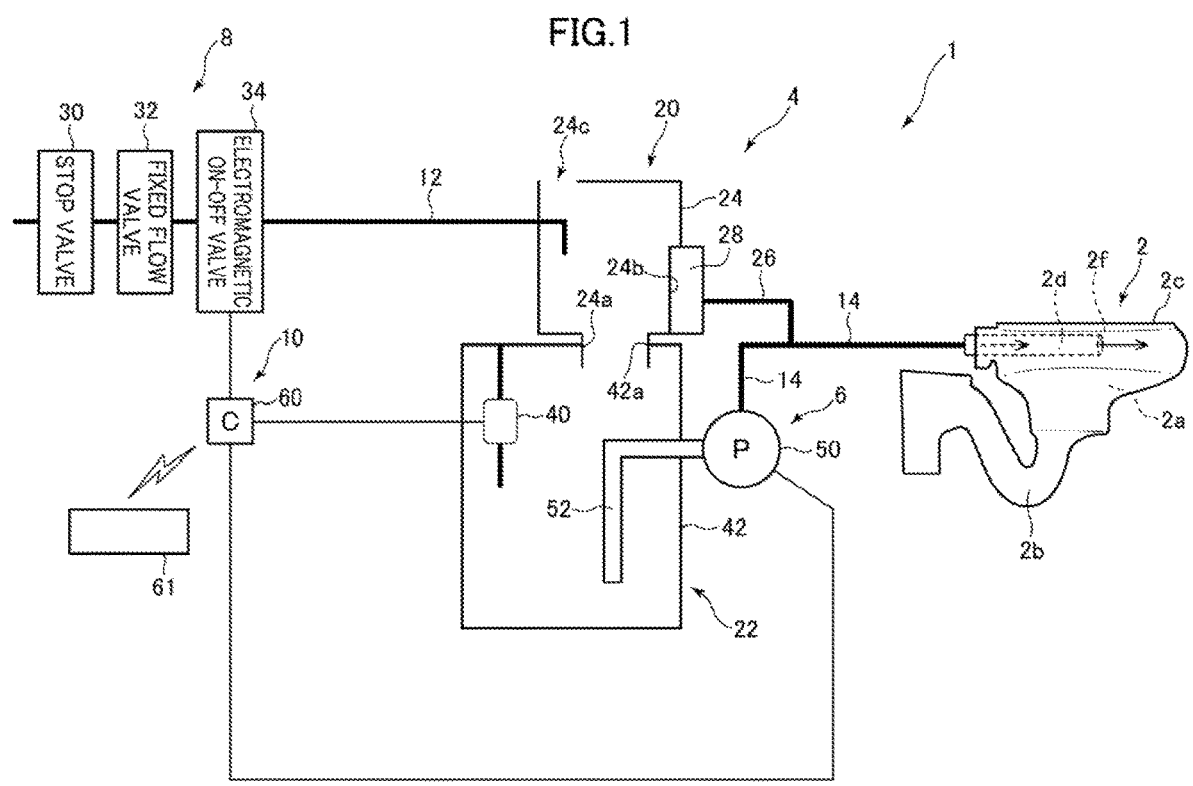
FIG. 1 is an overall configuration diagram showing a toilet device according to a first embodiment of the present invention.

FIG. 1 is an overall configuration diagram showing a toilet device according to a first embodiment of the present invention. As shown in FIG. 1, a toilet device 1 according to the first embodiment of the present invention is a flush toilet device that flushes toilet by discharging waste with flush water. The toilet device 1 includes a toilet main body 2, a flush water tank device (a flush water tank) 4 installed behind the toilet main body 2, a pump device 6 for supplying flush water stored in the flush water tank device 4 to the toilet main body 2, a water supply device 8 for supplying flush water to the flush water tank device 4, and a controller 10.

The toilet main body 2 is made of porcelain, and the toilet main body 2 includes a bowl 2a for receiving waste, a water discharge trap pipe 2b for discharging waste in the bowl 2a, the water discharge trap pipe 2b extending from a bottom portion of the bowl 2a, and a rim 2c formed at a top edge of the bowl 2a. A rim conduit 2d is formed on one lateral side behind the toilet main body 2, and a water discharge pipe 14 that extends from the pump device 6 is connected to the rim conduit 2d. Furthermore, the water discharge trap pipe 2b is connected to a sewage line (not shown).

Flush water that is supplied from the pump device 6 to the rim conduit 2d through the water discharge pipe 14 is discharged into the bowl 2a from a rim spout port 2f on a downstream end of the rim conduit 2d, and toilet flushing (toilet flushing by so-called 100% rim spouting) is thus performed. Then, flush water that is discharged into the bowl 2a from the rim spout port 2f flows through the water discharge trap pipe 2b together with black water, and is drained into the sewer. Additionally, as a spout port, the toilet main body 2 of the present embodiment includes only the rim spout port 2f, and flush water is discharged only from the rim spout port 2f. Additionally, in the present embodiment, flush water is discharged only from the rim spout port 2f, but other spout ports may also be provided; for example, a jet spout port may be provided in the water discharge trap pipe 2b, and water may be discharged from the rim spout port and the jet spout port.

The water supply device 8 includes a stop valve 30 that is provided on a water supply pipe 12 that is connected to a water pipe (not shown), a fixed flow valve 32 that is provided downstream of the stop valve 30, and an electromagnetic on-off valve 34 that is provided downstream of the fixed flow valve 32. The water supply pipe 12 is connected to the flush water tank device 4 on downstream of the water supply device 8.

The stop valve 30 is a valve for stopping supply of tap water (flush water) from the water pipe.

The fixed flow valve 32 is a valve for adjusting a flow rate of flush water that is supplied from the water pipe to be constant.

The electromagnetic on-off valve 34 is a valve that can be electromagnetically opened and closed, and when the electromagnetic on-off valve 34 is opened, flush water is supplied to the flush water tank device 4. The electromagnetic on-off valve 34 is electrically connected to the controller 10, and the controller 10 may switch between open and closed states.

The flush water tank device 4 includes a connecting unit 20 and a tank unit 22. At least a lower part of the flush water tank device 4 is mounted on a rear upper part of the toilet main body 2. The flush water tank device 4 is a so-called low-silhouette tank, with the height of the flush water tank device 4 being relatively low in a state of being mounted on the toilet main body 2.

The connecting unit 20 includes a water receiving housing 24 (a small tank), an overflow pipe 26, and a check valve 28.

The water receiving housing 24 has a lower opening 24a formed in a lower part, and an overflow port 24b formed in a side surface. Furthermore, an opening 24c that is open to outside is formed at least at a part of a top part of the water receiving housing 24. Because the opening 24c that communicates with outside is formed in the water receiving housing 24, air enters from outside, water on the water supply pipe 12 side and flush water in the flush water tank device 4 may be parted.

The lower opening 24a of the water receiving housing 24 is detachably attached to an upper opening 42a of a storage tank 42 of the tank unit 22. Furthermore, the water supply pipe 12 penetrates a side wall of the water receiving housing 24 to extend inside, and flush water that is supplied through the water supply pipe 12 is discharged into the water receiving housing 24.

The overflow pipe 26 that extends to the water discharge pipe 14 and inside which an overflow channel is formed is connected to the overflow port 24b, and the check valve 28 is attached to the overflow port 24b. The check valve 28 enables flush water in the water receiving housing 24 to flow into the overflow pipe 26 from the overflow port 24b while preventing flush water in the overflow pipe 26 from flowing backward into the water receiving housing 24. According to such a structure, when flush water in the water receiving housing 24 reaches a height of the overflow port 24b, the flush water in the water receiving housing 24 passes through the overflow port 24b and is discharged into the toilet main body 2 through the overflow pipe 26 and the water discharge pipe 14. Additionally, flush water in the water discharge pipe 14 is prevented from flowing backward into the water receiving housing 24 by the check valve 28.

The tank unit 22 includes the storage tank 42 and a float switch 40.

The storage tank 42 is a tank that is capable of storing flush water, and the upper opening 42a is formed at an upper part of the storage tank 42. The lower opening 24a of the water receiving housing 24 is connected to the upper opening 42a of the storage tank 42. Flush water that is supplied from the water supply pipe 12 into the water receiving housing 24 is supplied to the storage tank 42 through the lower opening 24a.

The float switch 40 is installed at an upper part inside the storage tank 42, and detects a predetermined upper water level to be taken as a reference for a full water level. The float switch 40 is electrically connected to the controller 10, and when the water level inside the storage tank 42 rises and reaches the predetermined upper water level, the float switch 40 issues a detection signal indicating that the predetermined upper water level is reached. When the detection signal is received, the controller 10 may be determined that the flush water tank has reached an approximately full state. The predetermined upper water level is a full water level, and is a water stop level in the storage tank 42 that is determined for normal flushing. Additionally, in the present embodiment, a tank capacity refers to, but is not limited to, the amount of flush water that is stored in the storage tank 42 when water is stored in the storage tank 42 up to the full water level, and the tank capacity may alternatively be a limit amount of water that can be stored in the tank device 4 (that is, the amount of water that is stored in a state where the water level is at the overflow port 24b), for example.

The pump device 6 includes a powered pump 50 and a water intake pipe 52 that is connected to the powered pump 50. The powered pump 50 has the water intake pipe 52 connected on an intake side, and the water discharge pipe 14 connected on a discharge side. The water intake pipe 52 penetrates a side wall of the storage tank 42 into the storage tank 42, and extends to a lower part in the storage tank 42. The powered pump 50 draws up flush water in the storage tank 42 through the water intake pipe 52, and supplies the flush water to the toilet main body 2 through the water discharge pipe 14. The pump device 6 is electrically connected to the controller 10, and is switched between a driven state and a stopped state by the controller 10. Additionally, the amount of discharge of flush water that is discharged per time from the storage tank 42 by the powered pump 50 (an instantaneous discharge flow rate (L/min)) is approximately constant regardless of time, and is greater than the amount of supply of flush water that is supplied per time to the tank device 4 by the water supply device 8 (an instantaneous supply flow rate (L/min)).

For example, the controller 10 includes a control circuit 60 including a CPU and a memory, and a remote control 61 that is capable of communicating with the control circuit 60 in a wireless or wired manner, and is implemented by the CPU of the control circuit 60 executing programs stored in the memory according to an input to the remote control 61.

The control circuit 60 of the controller 10 is electrically connected to the electromagnetic on-off valve 34 of the water supply device 8, and is capable of controlling supply of water by the water supply device 8. Specifically, the control circuit 60 may switch between a state where supply of water by the water supply device 8 is stopped and a state where water is supplied to the tank device 4 by the water supply device 8, by switching between on and off of the electromagnetic on-off valve 34.

Furthermore, the control circuit 60 of the controller 10 is electrically connected to the powered pump 50 of the pump device 6, and is capable of controlling driving of the pump device 6. Specifically, the control circuit 60 may switch between a driven state where power is supplied to the powered pump 50 and the powered pump 50 is driven to supply flush water from the tank device 4 to the toilet main body 2, and a stopped state where supply of power to the powered pump 50 is stopped and the powered pump 50 is stopped.

In the present embodiment, the controller 10 may set different flushing modes according to inputs to the remote control 61, where the amount of flush water that is discharged into the toilet main body 2 is different depending on the mode. Specifically, the controller 10 may set a first flushing mode in which the total amount of discharge of flush water that is discharged into the toilet main body 2 by the pump device 6 is greater than the tank capacity of the flush water tank, and a second flushing mode in which the total amount of discharge of flush water that is discharged into the toilet main body 2 by the pump device 6 is smaller than the tank capacity of the flush water tank. Additionally, the first flushing mode does not always correspond to large-flush, and the second flushing mode does not always correspond to small-flush, and one of the first and second flushing modes may be set for large-flush and a third flushing mode in which the total amount of discharge is smaller than in the second flushing mode may be set for small-flush in such a way that the amount of flush water set by each local municipality may be secured, for example.

In the following, a flow of the first flushing mode of the toilet device 1 of the first embodiment will be described.

Figure 2:
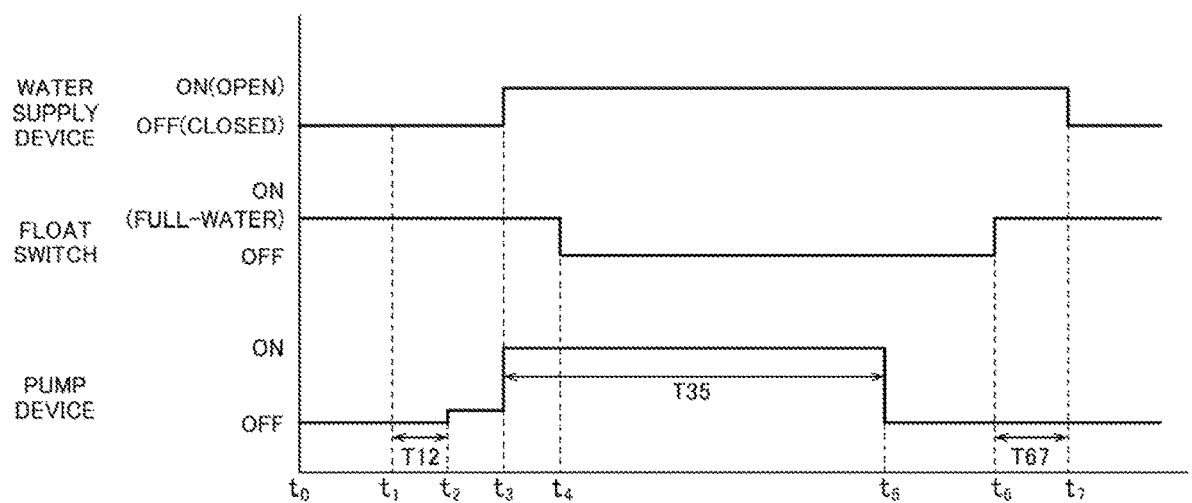
FIG. 2 is a flowchart showing driving of each function unit in a first flushing mode of the toilet device according to the first embodiment of the present invention.

FIG. 2 is a flowchart showing driving of each function unit in the first flushing mode of the toilet device according to the first embodiment of the present invention.

From time $t_0$ to $t_1$, the toilet device 1 is in a wait state. In the wait state, the electromagnetic on-off valve 34 of the water supply device 8 is closed (OFF), and the powered pump 50 of the pump device 6 is stopped (OFF). Furthermore, flush water is stored in the storage tank 42 of the tank device 4 up to the full water level, and the float switch is ON.

When there is an input to the remote control 61 at $t_1$ to perform the first flushing mode, the control circuit 60 of the controller 10 starts to supply power to the powered pump 50 at $t_2$ that is after a lapse of a predetermined period of time T12 from the input to perform the first flushing mode. However, for a predetermined time ($t_2$ to $t_3$) from supply of power, the powered pump 50 is not actually driven although the powered pump 50 is in an activated state and power is supplied thereto. Then, when $t_3$ is reached, the powered pump 50 of the pump device 6 is driven, and flush water in the storage tank 42 of the tank device 4 is supplied to the toilet main body 2 through the water discharge pipe 14 and is discharged from the rim spout port 2f. Furthermore, at the same time at $t_3$, the control circuit 60 of the controller 10 switches the electromagnetic on-off valve 34 of the water supply device 8 to an open state (ON). Supply of flush water from the water supply device 8 to the tank device 4 is thereby started. Flush water that is supplied to the tank device 4 is supplied to the storage tank 42 through the water receiving housing 24. Here, in a state where the water supply device 8 is in the open state and the powered pump 50 is driven, the instantaneous discharge flow rate FP (L/min) of flush water that is discharged from the storage tank 42 into the toilet main body 2 by the powered pump 50 is greater than the instantaneous supply flow rate FT (L/min) of flush water that is supplied to the tank device 4 by the water supply device 8. Accordingly, the water level of flush water in the storage tank 42 starts to drop, and the float switch is switched to OFF at a time $t_4$.

Then, when a predetermined period of time T35 elapses from the start of supply of water ($t_3$) by the powered pump 50 (or when a predetermined period of time elapses from the time $t_1$ when there is an input to the remote control 61 to perform the first flushing mode), the control circuit 60 stops supplying power to the powered pump 50 at a time $t_5$ (the pump device is switched to OFF). Additionally, in the first flushing mode, the total amount of discharge of flush water that is discharged into the toilet main body 2 during a driven period ($t_3$ to $t_5$) of the powered pump 50 (that is, FP(L/min)× ($t_5$−$t_3$)) is set greater than the tank capacity of the tank device.

Then, when the powered pump 50 is stopped at the time $t_5$, the water level of flush water in the storage tank 42 starts to rise. Then, when the water level of flush water in the storage tank 42 reaches close to the full water level at a time $t_6$, the float switch 40 is switched to ON, and a detection signal indicating that the full water level is detected is transmitted from the float switch 40 to the control circuit 60.

When a predetermined period of time T67 elapses from the time point ($t_6$) of reception of the detection signal from the float switch 40, the control circuit 60 closes the electromagnetic on-off valve 34 of the water supply device 8 and stops supply of flush water to the tank device 4 at a time $t_7$. Then, the toilet device 1 returns to the wait state.

As described above, in the present embodiment, a water supply period $t_3$ to $t_7$ when flush water is supplied to the tank device 4 by the water supply device 8 and a discharge period $t_3$ to $t_5$ when flush water is discharged from the tank device 4 into the toilet main body 2 by the pump device 6 overlap from the time $t_3$ to $t_5$.

In the second flushing mode in which the total amount of discharge of flush water that is discharged into the toilet main body 2 by the pump device 6 is smaller than the tank capacity of the flush water tank, the water supply period by the water supply device and the discharge period by the pump device are reduced. Additionally, in the second flushing mode, the water supply period $t_3$ to $t_7$ when flush water is supplied to the tank device 4 by the water supply device 8 and the discharge period $t_3$ to $t_5$ when flush water is discharged from the tank device 4 into the toilet main body 2 by the pump device 6 do not necessarily have to overlap each other, and flush water may be supplied to the tank device by the water supply device after flush water is discharged from the tank device into the toilet main body 2.

Additionally, in the description given above, the control circuit 60 closes the electromagnetic on-off valve 34 of the water supply device 8 after a lapse of a predetermined period of time from reception of the detection signal from the float switch 40, but in view of situations such as failure of the float switch 40, the control circuit 60 of the present embodiment closes the electromagnetic on-off valve 34 of the water supply device 8 after a lapse of a predetermined period of time from when the pump device 6 is stopped.

Figure 3:
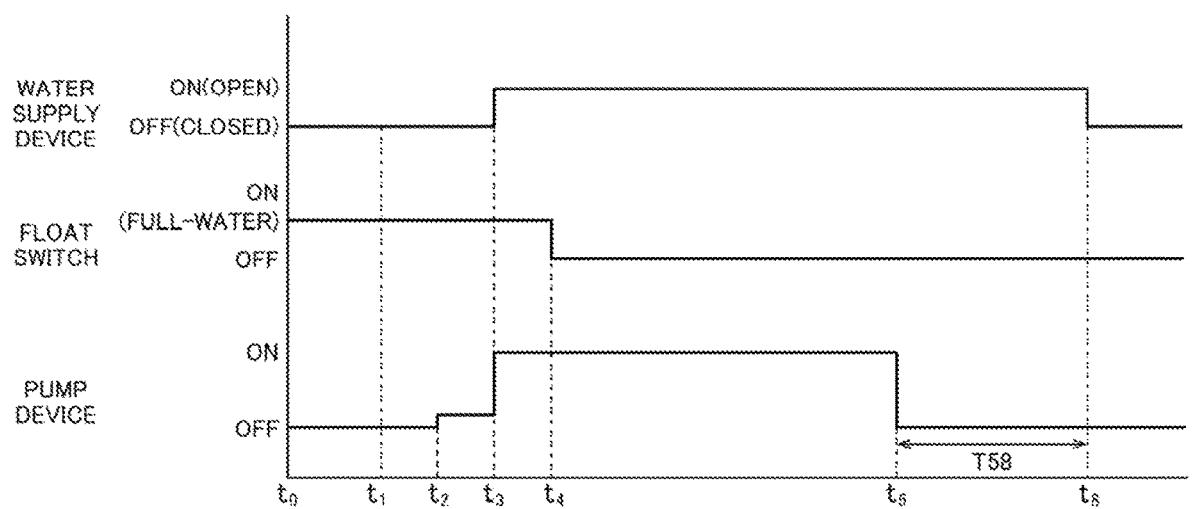
FIG. 3 is a flowchart showing driving of each function unit in the first flushing mode in a case of failure of a float switch of the flush toilet according to the first embodiment of the present invention.

FIG. 3 is a flowchart showing driving of each function unit in the first flushing mode in a case of failure of the float switch of the flush toilet according to the first embodiment of the present invention. The flow up to the time $t_5$ in a case of failure of the float switch is the same as the flow described with reference to FIG. 2, and description thereof will be omitted.

In a case of failure of the float switch, the float switch 40 is not switched to ON even after the time $t_5$ when the pump device 6 is stopped. In such a case, when a predetermined period of time T58 elapses from the time $t_5$ when the pump device 6 is stopped, the control circuit 60 closes the electromagnetic on-off valve 34 of the water supply device 8 and stops supply of flush water to the tank device 4 at a time $t_8$. Accordingly, supply of flush water to the tank device 4 may be stopped even in a case of failure of the float switch 40. Additionally, the predetermined period of time T58 from the time $t_5$ when the pump device 6 is stopped to the time $t_8$ when the electromagnetic on-off valve 34 of the water supply device 8 is closed is set longer than the period of time from the time $t_5$ to $t_7$ in the flowchart described with reference to FIG. 2.

The following effects may be achieved by the first embodiment of the present invention.

According to the present embodiment, in the first flushing mode, driving of the pump device 6 and the water supply device 8 is controlled such that a part of the water supply period $t_3$ to $t_7$ when flush water is supplied by the water supply device 8 overlaps the discharge period $t_3$ to $t_5$ when flush water is discharged by the pump device 6, and thus, the size of the tank device 4 may be reduced, and also, a sufficient amount of flush water greater than the tank capacity of the tank device 4 may be discharged from the rim spout port 2f of the toilet main body 2.

Furthermore, according to the present embodiment, the toilet main body 2 is configured such that flush water is discharged only from the rim spout port 2f. In the case of discharging water from both a rim spout port and a jet spout port as in Japanese Patent Laid-Open No. 2009-30405, flush water supplied from a tank device is discharged from the jet spout port and flush water supplied from the water pipe is discharged from the rim spout port, and thus, a sufficient amount of flush water may be discharged into the toilet main body even if the capacity of the tank device is small. However, with the configuration as described in the present embodiment where flush water is discharged only from the rim spout port 2f, flush water that is supplied from the water pipe and flush water that is supplied from the tank device 4 cannot be discharged at the same time. However, according to the present embodiment, because driving of the pump device 6 and the water supply device 8 is controlled such that a part of the water supply period $t_3$ to $t_7$ when flush water is supplied by the water supply device 8 overlaps the discharge period $t_3$ to $t_5$ when flush water is discharged by the pump device 6, flush water that is supplied by the water supply device 8 may also be discharged in one flushing operation in addition to the amount of water stored in the tank device 4, and thus, a sufficient amount of flush water may be discharged into the toilet main body 2 even in the case of discharging flush water only from the rim spout port 2f.

Furthermore, according to the present embodiment, in the flushing mode, the controller 10 starts supply of flush water by the water supply device 8 and discharge of flush water by the pump device 6 at the same time. Accordingly, because supply of flush water by the water supply device 8 and discharge of flush water by the pump device 6 are started at the same time, discharge of flush water may be completed in a shortest time, and a time until the tank device 4 becomes full after water is discharged into the toilet main body 2 may be reduced.

Furthermore, according to the present embodiment, the flush water tank device 4 includes the opening 24c that is open to the outside, and in the first flushing mode, the instantaneous discharge flow rate (L/min) of flush water discharged into the toilet main body 2 by the pump device 6 is greater than the instantaneous supply flow rate (L/min) of flush water supplied to the flush water tank device 4 by the water supply device 8. The flush water tank device 4 includes the opening 24c that is open to the outside as a partition to an upstream side (the water supply device 8 side). Accordingly, when supply of flush water by the water supply device 8 and discharge of flush water by the pump device 6 are started at the same time, water possibly leaks to outside from the opening 24c. However, according to the present embodiment, because the instantaneous discharge flow rate (L/min) of flush water discharged into the toilet main body 2 by the pump device 6 is greater than the instantaneous supply flow rate (L/min) of flush water supplied to the flush water tank device 4 by the water supply device 8, leakage of water from the opening 24c to the outside may be prevented even when supply of flush water by the water supply device 8 and discharge of flush water by the pump device 6 are started at the same time.

Furthermore, according to the present embodiment, the overflow pipe 26 is connected at a position lower than the opening 24c of the water receiving housing 24 of the flush water tank device 4, and the overflow pipe 26 communicates with the rim spout port through the water discharge pipe 14. Because the overflow pipe 26 is provided in such a manner, leakage of water from the opening 24c may be more reliably prevented even when the opening 24c is formed in the water receiving housing 24 of the flush water tank device 4.

Furthermore, according to the present embodiment, the float switch 40 is provided in the flush water tank device 4, and the controller 10 stops driving of the water supply device 8 when a detection signal is received from the float switch 40. Even when the float switch is provided, if the instantaneous discharge flow rate and the instantaneous supply flow rate are substantially the same, the water level in the flush water tank does not drop greatly and the float switch keeps transmitting the detection signal, and thus, driving of the water supply device is possibly not stopped based on the detection signal from the float switch. However, in the present embodiment, because supply of flush water by the water supply device 8 and discharge of flush water by the pump device 6 are started at the same time in the first flushing mode, and the instantaneous discharge flow rate is greater than the instantaneous supply flow rate, the water level of flush water in the flush water tank device 4 inevitably drops, the float switch 40 temporarily stops transmitting the detection signal, and driving of the water supply device 8 may be stopped based on the detection signal from the float switch 40.

Furthermore, according to the present embodiment, the controller 10 stops supply of water by the water supply device 8 when a predetermined period of time elapses from the start of supply of water by the water supply device 8. Accordingly, even in a case of failure of the float switch 40, for example, supply of water may be reliably stopped, and leakage of water may be prevented.

In each embodiment described above, the controller 10 controls driving of the pump device and the water supply device such that a part of the water supply period when flush water is supplied by the water supply device 8 overlaps a part of the discharge period when flush water is discharged by the pump device 6, but such a case is not restrictive, and all of the water supply period when flush water is supplied by the water supply device 8 may overlap a part of the discharge period when flush water is discharged by the pump device 6, or a part of the water supply period when flush water is supplied by the water supply device 8 may overlap all of the discharge period when flush water is discharged by the pump device 6, or all of the water supply period when flush water is supplied by the water supply device 8 may overlap all of the discharge period when flush water is discharged by the pump device 6.

Second Embodiment

In the first embodiment described above, when there is an input to the remote control 61 to perform the first flushing mode, the control circuit 60 of the controller 10 first switches the electromagnetic on-off valve 34 of the water supply device 8 to the open state (ON) at the time $t_1$, and then, at the time $t_3$, the control circuit 60 starts discharge of flush water by the pump device 6. However, the present invention is not limited to such a case.

Figure 4:
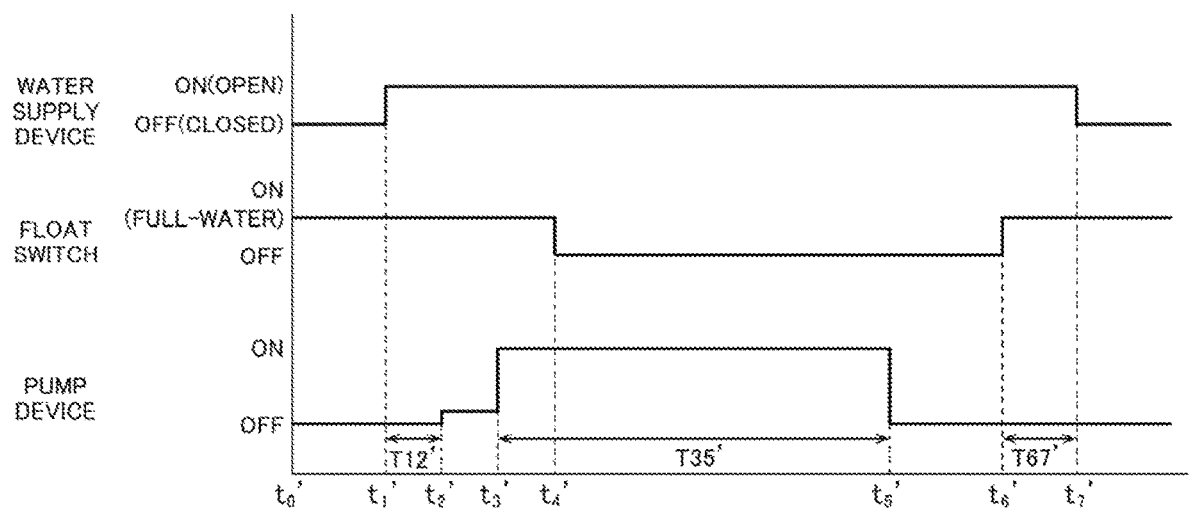
FIG. 4 is a flowchart showing driving of each function unit in the first flushing mode of the toilet device according to a second embodiment of the present invention.

FIG. 4 is a flowchart showing driving of each function unit in the first flushing mode of the toilet device according to a second embodiment of the present invention. In the second embodiment, an overall configuration of the toilet device is the same as that of the toilet device of the first embodiment described with reference to FIG. 1, and driving of each function unit in the first flushing mode is different from that of the first embodiment.

From time $t_0'$ to $t_1'$, the toilet device 1 is in the wait state. In the wait state, the electromagnetic on-off valve 34 of the water supply device 8 is closed (OFF), and the powered pump 50 of the pump device 6 is stopped (OFF). Furthermore, flush water is stored in the storage tank 42 of the tank device 4 up to the full water level, and the float switch is ON.

When there is an input to the remote control 61 at $t_1'$ to perform the first flushing mode, the control circuit 60 of the controller 10 switches the electromagnetic on-off valve 34 of the water supply device 8 to the open state (ON). Supply of flush water from the water supply device 8 to the tank device 4 is thereby started. Flush water that is supplied to the tank device 4 is supplied to the storage tank 42 through the water receiving housing 24. Additionally, when the water level inside the tank device 4 rises and reaches the overflow port 24b of the water receiving housing 24, the supplied flush water is discharged to the overflow pipe 26 from the overflow port 24b, and is discharged into the toilet main body 2 through the water discharge pipe 14.

Then, at $t_2'$ that is after a lapse of a predetermined period of time T12' from the input to perform the first flushing mode, the control circuit 60 starts to supply power to the powered pump 50. However, for a predetermined time ($t_2'$ to $t_3'$) from supply of power, the powered pump 50 is not actually driven although the powered pump 50 is in an activated state and power is supplied thereto. Then, when $t_3'$ is reached, the powered pump 50 of the pump device 6 is driven, and flush water in the storage tank 42 of the tank device 4 is supplied to the toilet main body 2 through the water discharge pipe 14 and is discharged from the rim spout port 2f. Here, in a state where the water supply device 8 is in the open state and the powered pump 50 is driven, the instantaneous discharge flow rate FP (L/min) of flush water that is discharged from the storage tank 42 into the toilet main body 2 by the powered pump 50 is greater than the instantaneous supply flow rate FT (L/min) of flush water that is supplied to the tank device 4 by the water supply device 8. Accordingly, the water level of flush water in the storage tank 42 starts to drop, and the float switch is switched to OFF at a time $t_4'$.

Then, when a predetermined period of time T35' elapses from the start of supply of water ($t_3'$) by the powered pump 50 (or when a predetermined period of time elapses from the time $t_1'$ when there is an input to the remote control 61 to perform the first flushing mode), the control circuit 60 stops supplying power to the powered pump 50 at a time $t_5'$ (the pump device is switched to OFF). Additionally, in the first flushing mode, in relation to a driven period ($t_3'$ to $t_5'$) of the powered pump 50, the total amount of discharge of flush water that is discharged into the toilet main body 2 during the driven period (that is, FP(L/min)×($t_5'-t_3'$)) is set greater than the tank capacity of the tank device.

Then, when the powered pump 50 is stopped at the time $t_5'$, the water level of flush water in the storage tank 42 starts to rise. Then, when the water level of flush water in the storage tank 42 reaches close to the full water level at a time $t_6'$, the float switch 40 is switched to ON, and a detection signal indicating that the full water level is detected is transmitted from the float switch 40 to the control circuit 60.

When a predetermined period of time T67' elapses from the time point ($t_6'$) of reception of the detection signal from the float switch 40, the control circuit 60 closes the electromagnetic on-off valve 34 of the water supply device 8 and stops supply of flush water to the tank device 4 at a time $t_7'$. Then, the toilet device 1 returns to the wait state.

As described above, in the present embodiment, a water supply period $t_3'$ to $t_7'$ when flush water is supplied to the tank device 4 by the water supply device 8 and a discharge period $t_3'$ to $t_5'$ when flush water is discharged from the tank device 4 into the toilet main body 2 by the pump device 6 overlap from the time $t_3'$ to $t_5'$.

Additionally, according to the embodiment described above, the following effect may be achieved in addition to the effects of the first embodiment.

In the present embodiment, because supply of flush water by the water supply device 8 is started before discharge of flush water by the pump device 6, flush water possibly leaks from the flush water tank device 4. However, according to the present embodiment, such leakage of water may be reliably prevented because the overflow pipe 26 is connected to the water receiving housing 24.

REFERENCE SIGNS LIST 1 toilet device
2 toilet main body
2a bowl
2b water discharge trap pipe
2c rim
2d rim conduit
2f rim spout port
4 flush water tank device
6 pump device
8 water supply device
10 controller
12 water supply pipe
14 water discharge pipe
20 connecting unit
22 tank unit
24 water receiving housing
24a lower opening
24b overflow port
24c opening
26 overflow pipe
28 check valve
30 stop valve
32 fixed flow valve
34 electromagnetic on-off valve
40 float switch
42 storage tank
42a upper opening
50 powered pump
52 water intake pipe
60 control circuit
61 remote control

What is claimed is:

1. A flush toilet for discharging waste with flush water, the flush toilet comprising:
a toilet main body including a bowl for receiving waste, a rim formed at a top edge of the bowl, and a rim spout port for discharging supplied flush water to the rim;
a flush water tank for storing flush water for flushing the toilet main body;
a pump device for supplying flush water in the flush water tank to the toilet main body;

a water supply device for supplying flush water to the flush water tank; and a controller for controlling driving of the pump device, the controller being capable of controlling supply of flush water by the water supply device, wherein the controller is capable of performing a flushing mode in which a total amount of discharge of flush water that is discharged to the rim spout port by the pump device is greater than a tank capacity of the flush water tank, and the controller controls driving of the pump device and the water supply device in the flushing mode such that at least a part of a water supply period when flush water is supplied by the water supply device overlaps at least a part of a discharge period when flush water is discharged by the pump device, wherein the toilet main body is configured such that flush water is discharged only from the rim spout port.

2. The flush toilet according to claim 1, wherein, in the flushing mode, the controller starts supply of flush water by the water supply device and discharge of flush water by the pump device simultaneously.

3. The flush toilet according to claim 2, wherein the flush water tank includes an opening that is open to outside, and in the flushing mode, an instantaneous discharge flow rate (L/min) of flush water to the toilet main body by the pump device is greater than an instantaneous supply flow rate (L/min) of flush water to the flush water tank by the water supply device.

4. The flush toilet according to claim 1, wherein an overflow channel is connected to the flush water tank, and the overflow channel communicates with the rim spout port.

5. The flush toilet according to claim 3, further comprising a float switch that is provided in the flush water tank, and that is capable of transmitting a detection signal to the controller when detecting that flush water in the flush water tank is at or above a predetermined water level, wherein the controller stops driving of the water supply device when the detection signal is received from the float switch.

6. The flush toilet according to claim 5, wherein the controller stops water supply by the water supply device when a predetermined period of time elapses from start of water supply by the water supply device.

* * * * *